United States Patent
Osorio et al.

(10) Patent No.: US 11,459,472 B2
(45) Date of Patent: Oct. 4, 2022

(54) MICROWAVABLE SOLVENT-BASED PACKAGING INK COMPOSITION

(71) Applicant: SUN CHEMICAL CORPORATION, Parsippany, NJ (US)

(72) Inventors: Jarol Osorio, Charlotte, NC (US); Kyle Hill, Charlotte, NC (US); Ted Kreutz, Carlstadt, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 42 days.

(21) Appl. No.: 16/975,816

(22) PCT Filed: Feb. 28, 2020

(86) PCT No.: PCT/US2020/020302
§ 371 (c)(1),
(2) Date: Aug. 26, 2020

(87) PCT Pub. No.: WO2020/180652
PCT Pub. Date: Sep. 10, 2020

(65) Prior Publication Data
US 2021/0009825 A1    Jan. 14, 2021

Related U.S. Application Data

(60) Provisional application No. 62/812,300, filed on Mar. 1, 2019.

(51) Int. Cl.
*C09D 11/102* (2014.01)
*B41M 1/04* (2006.01)
(Continued)

(52) U.S. Cl.
CPC ............. *C09D 11/102* (2013.01); *B41M 1/04* (2013.01); *B41M 1/10* (2013.01); *B41M 1/26* (2013.01); *B65D 65/42* (2013.01); *C09D 11/037* (2013.01)

(58) Field of Classification Search
None
See application file for complete search history.

(56) References Cited

U.S. PATENT DOCUMENTS 5,171,594 A    12/1992 Babbitt
9,416,280 B2 *  8/2016 Richards .............. C09D 11/101
(Continued)

FOREIGN PATENT DOCUMENTS

EP    0 466 361    1/1992
JP    5023925    4/2009
(Continued)

OTHER PUBLICATIONS

Cray Valley, Technical Data Sheet for SMA 17352, Mar. 2016 (Year: 2016).*
(Continued)

*Primary Examiner* — Joshua D Zimmerman
(74) *Attorney, Agent, or Firm* — Marian E. Fundytus; Ostrolenk Faber LLP.

(57) ABSTRACT

Described herein are printing ink compositions suitable for printing of microwavable flexible packaging. The printed black ink exhibits low microwave energy absorption, thus minimizing the risk of charring, arcing, ignition, distortion or burning during microwave heating processes. Nitrocellulose resin, a solvent, a polyurethane resin, and a carbon black pigment having at least one of an imaginary permittivity of ≤3, preferably ≤2, and a surface oxygen content of 1 wt % to 3 wt %, preferably 1.5 wt % to 2.5 wt % are among the components of the printing ink compositions. Also described is packaging suitable for exposure to microwave energy upon which the inks have been printed.

22 Claims, 1 Drawing Sheet

Inventive Example 1

60 MINUTES @ 1250 WATT

DPT-285 Black

5 SECONDS
@ 1250 WATT

(51) Int. Cl.
*B41M 1/10* (2006.01)
*B41M 1/26* (2006.01)
*B65D 65/42* (2006.01)
*C09D 11/037* (2014.01)

(56) References Cited

U.S. PATENT DOCUMENTS

2010/0272968 A1* 10/2010 Metla ................ B32B 23/08
 428/195.1
2013/0129992 A1* 5/2013 Jahromi ............ B32B 37/153
 428/201
2017/0002218 A1* 1/2017 Okamoto ............ C09D 11/38

FOREIGN PATENT DOCUMENTS

| WO | WO 2005/068567 A1 | 7/2005 |
| WO | WO 2009/065502 A1 | 5/2009 |
| WO | WO 2014/129461 A1 | 8/2014 |
| WO | WO 2016/060245 A | 4/2016 |

OTHER PUBLICATIONS

International Search Report issued in International Application No. PCT/US2020/020302, dated Jun. 9, 2020.
Written Opinion of the International Searching Authority issued in International Application No. PCT/US2020/020302, dated Jun. 9, 2020.

* cited by examiner

MICROWAVABLE SOLVENT-BASED PACKAGING INK COMPOSITION

CROSS REFERENCE TO RELATED APPLICATIONS

The present application is a § 371 National Phase application based on PCT/US2020/20302 filed Feb. 28, 2020, which claims the benefit of U.S. Provisional Application No. 62/812,300, filed Mar. 1, 2019 the subject matter of each of which is incorporated by reference in their entirety.

The availability of packaged and processed foods has evolved and grown to meet the demand for convenient and easy to prepare food products. For example, food can be heated and cooked while remaining in the convenience food packaging. At least some kinds of convenience food packaging is microwave safe—that it, it can be safely exposed to microwave energy emitted by a household microwave oven. Such microwave packaging may be constructed of flexible materials such as polymeric films, for example polyethylene terephthalate (PET) and polyethylene terephthalate glycol (PET-G). These materials can be exposed to microwave energy without causing health and safety issues.

Packaging materials often do more than contain an item such as a food item. They also convey information to the consumer. That information includes, for example graphics, logos, and text, such as text in the form of product names, product descriptions, ingredients lists, nutritional information, and cooking instructions. This information is printed or applied to the packaging in the form of inks. Thus the inks, like the packaging materials, must be microwave safe. The inks must be able to withstand exposure to microwave energy without causing health and safety hazards.

Nitrocellulose resins are often included in inks used to print food packaging. Nitrocellulose resins are inexpensive, are available in abundant supply, possess a good combination of physical and chemical properties, and are high renewable content materials.

Black inks, in particular those containing carbon black pigments and nitrocellulose resins, may not be suited for use in printing microwavable packaging. These inks may present safety issues since they may ignite, burn, arc, char, etc. when exposed to microwave energy.

While not wishing to be bound by any theory, it may be that inks including carbon black pigments and nitrocellulose resins absorb microwave energy and transform same into heat that can trigger an exothermic response from the nitrocellulose, leading to ignition, charring, arcing, etc.

To address safety concerns, trichromatic black inks (that is, blends of yellow, magenta and cyan pigments) are currently used in place of black inks on microwave packaging. Carbon black pigments dispersed in resins other than nitrocellulose are also used to reduce the ignition and fire risk.

Neither of these approaches is ideal. Trichromatic black inks do not provide true black color. The color they produce is actually brown. Also, carbon black inks that do not include nitrocellulose, i.e., carbon black ink that include resins other than nitrocellulose lack the printability of nitrocellulose based inks. They also lack the functionality, versatility and low-cost benefit provided by nitrocellulose-based inks. Further, trichromatic black inks density measured only exhibit a color density value of 1.3 when measured with a spectrophotometer.

Thus, there is a need for a true black nitrocellulose based ink suitable for printing on microwaveable packaging, that is, an ink that does not create an unsafe or dangerous condition when exposed to microwave energy.

References that may be of interest include U.S. Pat. No. 5,171,594, EP 0 466 361, and JP 5023925.

SUMMARY OF THE INVENTION

Described herein are inks suitable for use in preparing microwaveable packaging that provide a true black color and which include nitrocellulose resins, but which absorb microwave energy at safe levels and thus do not prevent a safety hazard. That is, the inks do not undergo charring, arcing, ignition, distortion and burning of the packaging when exposed to microwave energy, or undergo same to an extent that would be regarded as safe or acceptable.

The inventors have found that inks formulated with a kind of carbon black pigment are safe for microwave use. Further, these inks can include nitrocellulose resin.

Described herein is a printing ink composition suitable for microwaveable packaging comprising nitrocellulose resin, a solvent, a polyurethane resin, and a carbon black pigment having at least one of an imaginary permittivity of ≤3, preferably ≤2, and a surface oxygen content of 1 wt % to 3 wt %, preferably 1.5 wt % to 2.5 wt %.

In one aspect, the carbon black pigment has an imaginary permittivity of ≤3, preferably ≤2, and a surface oxygen content of 1.0 wt % to 3.0 wt %, preferably 1.5 wt % to 2.5 wt %.

In one aspect, the imaginary permittivity of the carbon black pigment is ≤3, preferably ≤2 at 2450 MHz. This frequency is that on which conventional and/or consumer microwave ovens operate.

In one aspect, the printing ink composition also includes a styrene modified maleic anhydride resin.

In one aspect, the printing ink composition also includes another resin selected from polyester, polyurethane, polyamide, polyvinyl butyral (PVB), styrene modified resins and combinations thereof.

In one aspect, the nitrocellulose resin is present in an amount of 2.0 wt % to 8.0 wt %, preferably 3.0 wt % to 7.0 wt %, more preferably 4.0 wt % to 8.0 wt %, and even more preferably 4.5 wt % to 6.5 wt %, based on the total weight of the ink composition.

In one aspect, the solvent is present in an amount of 30 wt % to 90 wt %, preferably 40 wt % to 90 wt %, more preferably 50 wt % to 80 wt %, and even more preferably, 60 wt % to 80 wt %, based on the total weight of the ink composition.

In one aspect, the polyurethane resin is present in an amount of 2.0 wt % to 8.0 wt %, preferably 3.0 wt % to 8.0 wt %, more preferably 4.0 wt % to 8.0 wt %, and even more preferably 4.5 wt % to 6.5 wt %, based on the total weight of the ink composition.

In one aspect, the carbon black is present in an amount of 5.0 wt % to 35%, preferably 5.0 to 30 wt %, more preferably 10-25%, even more preferably 15 wt % to 25 wt %, based on the total weight of the ink composition.

In one aspect, the styrene modified maleic anhydride resin is present in an amount of 0.3 wt % to 4.0 wt %, preferably 0.5 wt % to 3.0 wt %%, more preferably 0.5-2.5%, even more preferably 0.8 wt % to 1.5 wt %, based on the total weight of the ink composition.

In one aspect, the polyurethane resin is an elastomeric resin.

In one aspect, the polyurethane resin is non-reactive with the other formulations in the composition.

In one aspect, the polyurethane resin is semi-aliphatic, that is the polyurethane resin includes aliphatic and aromatic groups.

In one aspect, the polyurethane resin is tin-free.

In one aspect, the polyurethane resin has a weight average molecular weight of 90,000 to 120,000.

In one aspect, the styrene modified maleic anhydride (SMA) resin comprises a partial mono-ester of styrene modified maleic anhydride.

In one aspect, the styrene maleic anhydride comprises a partial mono-ester of SMA and a mixture of two alcohols.

In one aspect, the solvents are selected from aliphatic alcohols, ester solvents and blends thereof. For example, $C_2$ to $C_3$ alcohols. Diacetone alcohol may also be used.

In one aspect, the printing ink composition also includes additives selected from polyolefin-based waxes, plasticizers, polysiloxanes, metal chelates, and combinations thereof.

In one aspect, the printing ink compositions exhibit a color density value of $\geq 1.6$, preferably $\geq 1.8$, more preferably $\geq 2.0$, and even more preferably $\geq 2.1$ when measured with a spectrophotometer.

Also described herein is a printed packaging material comprising the ink composition previously described (in its various aspects) that is printed on a substrate.

In one aspect, the printed packaging material includes a substrate that is a polymeric film selected from polyethylene terephthalate, polyethylene terephthalate glycol, polybutylene terephthalate, polycarbonate, polyolefin, cyclic polyolefins, alpha-polyolefins, polyethylene, polypropylene, oriented polypropylene, oriented polystyrene, polyvinyl chloride, and nylon.

In one aspect, the printed packaging material exhibits at least one of minimal charring, arcing, ignition and burning after exposure to 1250 watts of microwave energy for a duration of 5 seconds or longer.

In one aspect, the printed packaging material exhibits at least one of minimal charring, arcing, ignition and burning after exposure to 1250 watts of microwave energy for a duration of 30 seconds or longer.

In one aspect, the printed packaging material exhibits at least one of minimal charring, arcing, ignition and burning after exposure to 1250 watts of microwave energy for a duration of 1 minute or longer.

In one aspect, the printed packaging material exhibits at least one of minimal charring, arcing, ignition and burning after exposure to 1250 watts of microwave energy for a duration of 2 minutes or longer.

In one aspect, the printed packaging material exhibits at least one of minimal charring, arcing, ignition and burning after exposure to 1250 watts of microwave energy for a duration of 5 minutes or longer.

In one aspect, the printed packaging material exhibits at least one of minimal charring, arcing, ignition and burning after exposure to 1250 watts of microwave energy for a duration of 15 minutes or longer.

In one aspect, the printed packaging material exhibits at least one of minimal charring, arcing, ignition and burning after exposure to 1250 watts of microwave energy for a duration of 30 minutes or longer.

In one aspect, the printed packaging material exhibits at least one of minimal charring, arcing, ignition and burning after exposure to 1250 watts of microwave energy for a duration of 60 minutes or longer.

Also described herein is a process for providing a printed packaging film comprising applying the ink compositions as described herein on a substrate and drying the ink composition.

The described inks, when exposed to microwave energy, do not cause the ink itself or the packaging on which it is printed to undergo one or more of charring, arcing, ignition, distortion and burning, or which undergo these conditions only to an extent that is considered safe and acceptable (e.g., a minimal amount, such as a minimal amount of darkening of the package, which might be considered charring, can be accepted and tolerated. These conditions are now tolerated for currently available packaged products, such as microwaveable popcorn packages, which darken during the popping that occurs upon exposure to microwave energy).

In indicating ranges for component amounts, the amounts are, unless otherwise stated, the total amounts for that particular component, whether it be a single such component that is included, or more than one such component is included. For example, amount of solvent is indicated to be 30 wt % to 90 wt %, based on the total weight of the composition. These are the amounts apply whether only a single solvent is used or multiple solvents are used.

While the ink compositions described herein are indicated to be well suited for printing on microwaveable packaging, it should be understood that they can be used in other ways that the person of ordinary skill in the art would think as being appropriate.

DETAILED DESCRIPTION OF THE INVENTION

Figure 1:
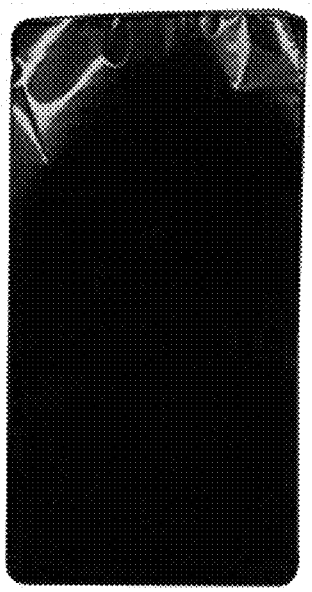
FIG. 1 are side-by-side photographs comparing substrates on which the printing ink composition of Example 1 and a comparative ink example have been printed, dried and then exposed to microwave energy.
Figure 1:
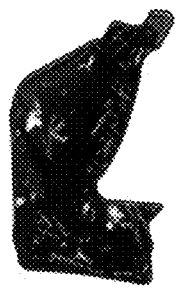
Figure 2:
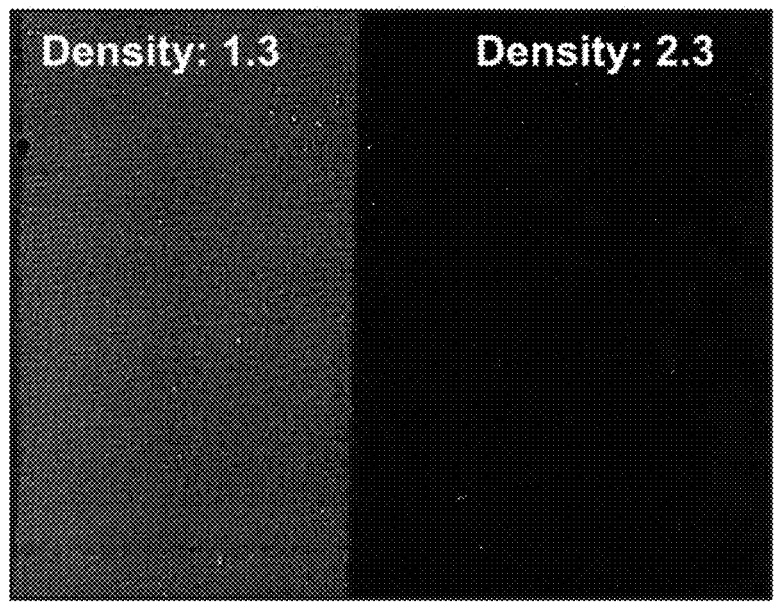
FIG. 2 are side-by-side photographs showing the color density for prints made with an ink as described herein (on the right, density=2.3) and a state of the art trichromatic black ink (on the left, density=1.3). The substrate is PET.

The ink compositions described herein include nitrocellulose and a carbon black pigment having one or more of the indicated imaginary permittivity and the specified surface oxygen content. The Applicants have found that unlike inks that contain carbon black pigments that do not meet one or both of these criteria, the described inks can be used to print on microwaveable packaging (which packaging may be flexible), and that such printed inks and microwaveable packaging printed with same safely come through the microwave heating process. Test data appearing later in this description shows that the inks withstood microwaving in a standard microwave oven (power output of 1250 watts) for up to and including 60 minutes. Again, inks that contain carbon black pigments that do not meet these criteria have been known to create an unsafe condition, i.e., they ignite, arc, char etc. when exposed to microwave energy.

Further, the described inks are solvent-based, which is particularly suitable for microwavable flexible packaging goods.

Nitrocellulose is a preferred resin for inclusion in printing inks due to its print performance, functional properties and cost benefit. Functional properties include high Tg, leading to desirable mechanical resistance for avoiding abrasion and scuff, print quality, anti-block property, and heat resistance. Also, the nitrogen content leads to good water resistance, pigment dispersion and surface. Adhesion.

Carbon Black Pigment Properties—Imaginary Permittivity and Surface Oxygen

Relative permittivity is a complex number that has a real part and an imaginary part. The relative permittivity of a material can be expressed by the formula:

$$E = E' + iE'';$$

Where E is the relative permittivity, E' is the real part of the permittivity, E" is the imaginary part, and i is a constant wherein $i^2=-1$. E, E' and E" are unitless.

Applicant has found that imaginary permittivity (E") appears to play a role as to whether an ink containing carbon black can acceptably tolerate exposure to microwave energy without itself or an object on which it is deposited (such as when in a printing ink applied to a substrate) without igniting, charring, arcing etc.

Imaginary Permittivity Determination

Samples were prepared by placing the carbon black pigments identified in the table below into a DI Model 1500T coaxial line Liquid/Powder cell without compacting the pigments. Samples were measured three (3) times with an Anritsu 4647B vector network analyzer under the control of MU-EPSLN software for Macintosh OS X. Scanning occurred at 2000 MHz to 3000 MHz (with conventional microwave ovens operating at 2450 MHz). A full two port calibration was used and the permittivity was computed from the s-parameters. All measurements were made under ambient conditions ~22% RH and 20° C.

TABLE 1

| Carbon Black Pigment | Average Imaginary Permittivity (E") at 2450 MHz | Standard Deviation |
| --- | --- | --- |
| Mogul E | 1.74 | 0.21 |
| Raven 1180 | 1.90 | 0.10 |
| Regal 350 | 10.97 | 1.13 |
| Special Black 250 | 8.14 | 0.50 |
| Regal 99 R | 8.93 | 0.74 |

Measured Values of Surface Oxygen and Other Elements

The table below reports the Brunauer-Emmett-Teller (BET) theory surface area and distribution of carbon, oxygen and sulfur. The Mogul E and Raven 1180 carbon black pigments that have been found to avoid igniting, charring, etc. when exposed to microwave energy contain significantly greater amounts of surface oxygen (O %) when compared to carbon black pigments that contain significantly less surface oxygen and which have ignite, char, etc. when exposed to microwave energy.

Carbon black consists of more than 96 percent of amorphous carbon and of small quantities of oxygen, hydrogen, nitrogen, and sulfur. Most of these elements are concentrated on the surface.

The amounts of C, O, and S in the carbon black pigments were determined on a Perkin Elmer 2400 Series II CHNS/O analyzer and is based on the principle of the "Dumas Method" ad detected by a thermal conductivity detector, which gives an output signal proportional to the concentration of the individual components related to the elements. Precision for % C, % O and % S is +/−0.30% and limit of detection (LOD)<0.10%. Surface area of the pigment powders was determined by Nitrogen Gas Adsorption, B.E.T Method, using the Nova 2000e surface area analyzer.

TABLE 2

| CB Sample | Specific Surface area m$^2$/g | % C (wt %) | % O (wt %) | % S (wt %) |
| --- | --- | --- | --- | --- |
| Cabot Mogul E | 43 | 96.5 | 1.95 | 1.01 |
| Raven 1180 | 90 | 97.3 | 1.86 | 1.07 |
| Cabot Regal 350R | 48 | 98.7 | 0.72 | 0.68 |
| Orion Special Black 250 | 46 | 98.8 | 0.43 | 0.22 |

In one aspect the surface sulfur content is ≤1.25%, preferably 1.15%, more preferably 1.10%, even more preferably 1.0%.

The black ink inks described herein, which include a carbon black pigment having at least one of an imaginary permittivity of ≤3, preferably ≤2, and a surface oxygen content of 1 wt % to 3 wt %, preferably 1.5 wt % to 2.5 wt %, exhibit low microwave energy absorption. Thus there is minimal risk of overheating, arcing and ignition during microwave heating.

In one aspect, the black ink inks described herein include a carbon black pigment having an imaginary permittivity of ≤3, preferably ≤2, and a surface oxygen content of 1 wt % to 3 wt %, preferably 1.5 wt % to 2.5 wt %.

Further, the described inks are aesthetically superior since they allow printers to make microwaveable packaging with "true" black inks as opposed to "trichromatic" inks, resulting in printed graphics with stronger black color. The described inks also improve the quality of printed graphics by allowing printers to use nitrocellulose-based carbon black inks that are widely accepted in the industry for their premium print quality performance compared to alternative inks using other types of binders. Trichromatic inks have been found to exhibit a color density of 1.3, while the inks described herein exhibit a color density of 2.1.

The described ink compositions include a carbon black pigment having at least one of an imaginary permittivity of ≤3, preferably ≤2, and a surface oxygen content of 1 wt % to 3 wt %, preferably 1.5 wt % to 2.5 wt %, nitrocellulose resin, a polyurethane resin, and a solvent. More than one nitrocellulose resin may be included in the ink compositions, more than one polyurethane resin may be included in the ink compositions, and more than one solvent may be included in the ink compositions.

More than one carbon black pigment may be included in the ink compositions, but the additional carbon black pigment should pigment have at least one of the aforementioned imaginary permittivity and surface oxygen content, or it should include a carbon black pigment or amount thereof that does not have an adverse effect on the ink and packaging when exposed to microwave energy (i.e., it should not facilitate ignition, charring, arcing, etc.).

The carbon black may be a low structure, highly oxidized surface (that is, having a surface oxygen content as described herein).

Two commercially available carbon black pigment products that can be used in the present ink compositions are Mogul E Carbon black from Cabot Corporation and Raven® 1180 available from Birla Carbon. Raven® 1180 is carbon black with the pigment black 7 color name. As shown above, these carbon black pigments meet the described criteria for imaginary permittivity and surface oxygen content.

Nitrocellulose resins: exemplary nitrocellulose resins include NC L 1/8 IPA SS; NC A400 IPA; DMX 3-5 IPA (isopropyl alcohol); NCE360 IPA; DLX-3-5 nitrocellulose (Nobel). These resins are available from Dow, Asahi, Bergerac, and Nitroquimica. In one aspect, the nitrogen content of a suitable resin is 10.6 to 11.9 (% by weight?)

Solvents that may be included in the described ink compositions include one or more of aliphatic hydrocarbons, cyclic hydrocarbons, aromatic hydrocarbons, ketones, aldehydes, alcohols, ethers, asters and combinations thereof. Suitable solvents include n-propyl alcohol, n-propyl acetate, ethyl alcohol, ethyl acetate, isopropyl alcohol, isopropyl acetate, ethoxy propanol, propoxy propanol, diacetone alcohol, glycol ether DPM (dipropylene glycol monomethyl ether), PM acetate (propylene glycol monomethyl ether), and combinations thereof.

The polyurethane resin(s) are preferably one or more of being tin-free, semi-aliphatic, and high molecular weight (weight average molecular weight of 90,000 to 120,000). Suitable polyurethane resins include elastomeric polyurethanes, elastomeric polyurethane polyols.

The polyurethane resin may be a polyurethane polyol. The polyurethane polyol may have a glass transition temperature (Tg) of 100° C. to 160° C., preferably 120° C. to 140° C. The polyurethane polyol may have an equivalent hydroxyl value of 150 mg KOH/g to 250 mg KOH/g, preferably 175 mg KOH/g to 225 mg KOH/g.

The polyurethane should preferably be inert, that is, be non-reactive with the other components in the ink composition. The polyurethane may be elastomeric. The polyurethane may be semi-aliphatic. The polyurethane may be tin-free. The polyurethane may be of high molecular weight. Preferred materials include Morchem TP-633 and Variplus 1201 TF (Evonik); Neorez U-475, Neorez U-471 and Versamid PUR 1010.

The described ink compositions may also include styrene modified resins, such as, for example, styrene modified maleic anhydride (SMA) copolymers. These resins can serve as binder for the pigment and provide heat and chemical resistance to the ink. The styrene modified maleic anhydride copolymer resins may contain a partial monoester of SMA copolymer. The SMA resin may have a weight average molecular weight of 4,000 to 11,000, more preferably 5,000 to 9,000, even more preferably 6,000 to 8,000. The SMA resin may have a Tg of 100° C. to 150° C., preferably 115° C. to 135° C. In another embodiment the SMA may have an acid equivalent value of 220 mg KOH/g to 320 mg KOH/g, more preferably 260 mg KOH/g to 280 mg KOH/g.

One preferred commercially available SMA is a SMA resin available under the SMA® 17352F tradename, from Cray Valley. SMA® 17352F is a partial mono ester of SMA and a mixture of two alcohols.

Other resins may be included in the ink compositions. They include polyamides such as Unirez 2215, Unirez 2218 and Styrene Allyl Alcohol SAA-100.

The described ink compositions may also include adhesion promoters, such as titanium chelate adhesion promoters.

Suitable titanium chelate adhesion promoters include 492-931:S.B. adhesion promoter, available from Sun Chemical; tetra n-butyl titanate; tetra isopropyl titanate; tetra 2-ethylhexyl titanate; polybutyl titanate; isopropyl butyl titanate; tetra n-propyl titanate; tetra ethyl titanate; tetra t-butyl titanate; tetra n-propyl zirconate; tetra n-butyl zirconate.

The solvent-based ink compositions can also contain colorants in addition to carbon black. Suitable colorants include but are not limited to organic or inorganic pigments and dyes. The dyes include but are not limited to fluorescent dyes, azo dyes, anthraquinone dyes, xanthene dyes, azine dyes, combinations thereof and the like. Organic pigments may be one pigment or a combination of pigments, such as for instance Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colors desired.

Additives may be included in the ink compositions to enhance and improve different ink properties. A partial list of such additives includes but is not limited to adhesion promoters, silicones, light stabilizers, de-gassing additives, ammonia, flow promoters, defoamers, antioxidants, stabilizers, surfactants, dispersants, plasticizers, rheological additives, waxes, silicones, polyolefin-based waxes, monomeric and/or polymeric plasticizers, polysiloxanes and metal chelates. Combinations of additives may be included.

The ink compositions may include extenders such as clay, talc, calcium carbonate, magnesium carbonate or silica to adjust water uptake, misting and color strength.

The present ink compositions are particularly suitable for microwavable flexible packaging goods. The printed black ink exhibits low microwave energy absorption, thus minimizing the risk of overheating, arcing and ignition during microwave heating processes.

The described inks can be printed by any known printing process, such as flexography, rotogravure, screen, lithographic, inkjet, to name a few. They are particularly suited for printing by flexography and rotogravure.

The described inks can be printed can be printed on paper, paperboard, other cellulosic substrates, and on virtually any polymeric film, for example polyethylene, polyester, polypropylene, biaxially oriented films, polyethylene terephthalate, polyethylene terephthalate glycol, polybutylene terephthalate, polycarbonate, polyolefin, cyclic polyolefins, alpha-polyolefins, polyethylene, polypropylene, oriented polypropylene, oriented polystyrene, polyvinyl chloride, and nylon, to name a few.

EXAMPLES

The following examples illustrate specific aspects of the present invention and are not intended to limit the scope thereof and should not be construed as limiting.

Examples 1-6 are ink formulations within the description of the present disclosure that include Mogul E carbon black, nitrocellulose resins, solvent mixtures, and polyurethane resins, among others. Examples 7-12 are ink formulations within the description of the present disclosure that include Raven® 1180 carbon black, nitrocellulose resins, solvent mixtures, and polyurethane resins, among others.

Ink compositions were prepared by grinding the carbon black pigment in a media mill with nitrocellulose resin and solvents to form a pigment dispersion. Separately, the other components of the inks (e.g., the polyurethane resins, SMA resin, additives, some solvent) are mixed together to form a varnish. Inks are obtained by mixing the pigment dispersion with the varnish.

| Inventive Example 1 | |
|---|---|
| Material | wt % |
| Normal Propyl Acetate | 13.7 |
| Normal Propyl Alcohol | 30.3 |
| Ethyl Alcohol | 10.2 |
| Isopropyl Alcohol | 8.7 |
| Ethyl Acetate | 3.1 |
| Isopropyl Acetate | 0.1 |

Inventive Example 1

| Material | wt % |
| --- | --- |
| Nitrocellulose Resin DLX-3-5 | 5.6 |
| PU Resin Morchem TP-633 | 3.3 |
| PU Resin Variplus 1201 TF | 1.2 |
| Styrene Maleic Anhydride SMA-17352F | 1.4 |
| Titanate 492-931:S.B. | 0.4 |
| Additives | 0.7 |
| Carbon Black Pigment 7 Mogul E | 21.3 |
| Total | 100.0 |

Inventive Example 2

| Material | wt % |
| --- | --- |
| Normal Propyl Alcohol | 10.4 |
| Normal Propyl Acetate | 5.4 |
| Ethoxy Propanol | 35.1 |
| Isopropyl Acetate | 0.1 |
| Isopropyl Alcohol | 5.8 |
| Diacetone Alcohol | 2.4 |
| Ethyl Alcohol | 1.2 |
| Glycol Ether DPM | 3 |
| PM Acetate | 4.9 |
| Ethyl Acetate | 1 |
| Nitrocellulose Resin | 4.9 |
| PU Resin Morchem TP-633 | 3.9 |
| PU Resin Variplus 1201 TF | 1.5 |
| Styrene Maleic Anhydride | 1.2 |
| Titanate | 0.3 |
| Additives | 0.6 |
| Carbon Black Pigment 7 | 18.3 |
| Total | 100.0 |

Inventive Example 3

| Material | wt % |
| --- | --- |
| Normal Propyl Alcohol | 13.3 |
| Normal Propyl Acetate | 6.1 |
| Isopropyl Alcohol | 5.7 |
| Diacetone Alcohol | 2.3 |
| Ethyl Alcohol | 1.2 |
| Glycol Ether DPM | 2.9 |
| PM Acetate | 4.7 |
| Ethyl Acetate | 1 |
| Isopropyl Acetate | 0.1 |
| Propoxy Propanol | 31.3 |
| Nitrocellulose Resin | 4.9 |
| PU Resin Morchem TP-633 | 3.77 |
| PU Resin Variplus 1201 TF | 1.43 |
| Styrene Maleic Anhydride | 1.2 |
| Titanate | 0.3 |
| Carbon Black Pigment 7 | 19.8 |
| Total | 100.0 |

Inventive Example 4

| Material | wt % |
| --- | --- |
| Normal Propyl Acetate | 12.2 |
| Normal Propyl Alcohol | 30.7 |
| Nitrocellulose Resin | 5.5 |
| Isopropyl Alcohol | 2.3 |
| Additives | 0.7 |
| Carbon Black Pigment 7 | 20.8 |
| Ethyl Alcohol | 8 |
| Normal Propyl Alcohol | 0.9 |
| PU Resin Morchem TP-633 | 2.5 |
| PU Resin Variplus 1201 TF | 1.0 |
| Isopropyl Alcohol | 5 |
| Normal Propyl Acetate | 1.1 |
| Ethyl Acetate | 2.4 |
| Isopropyl Acetate | 0 |
| Styrene Maleic Anhydride | 1.1 |
| Titanate | 0.3 |
| Wax | 4.2 |
| Plasticizer | 0.9 |
| Silicone | 0.4 |
| Total | 100.0 |

Inventive Example 5

| Material | wt % |
| --- | --- |
| Additives | 0.7 |
| Carbon Black Pigment 7 | 19.8 |
| Nitro Cellulose Resin | 5.3 |
| PU Resin Morchem TP-633 | 3.4 |
| PU Resin Variplus 1201 TF | 1.3 |
| Styrene Maleic Anhydride | 1.1 |
| Titanate | 0.3 |
| Wax | 4.2 |
| Plasticizer | 0.9 |
| Silicone | 0.4 |
| Normal Propyl Alcohol | 4.6 |
| Normal Propyl Acetate | 3.6 |
| Ethyl Alcohol | 1 |
| Glycol Ether DPM | 2.6 |
| PM Acetate | 4.2 |
| Isopropyl Alcohol | 5.5 |
| Ethyl Acetate | 0.9 |
| Diacetone Alcohol | 2.1 |
| Isopropyl Acetate | 0.1 |
| Ethoxy Propanol | 38 |
| Total | 100.0 |

Inventive Example 6

| Material | wt % |
| --- | --- |
| Propoxy Propanol | 31.6 |
| Carbon Black Pigment 7 | 19.8 |
| Nitro Cellulose Resin | 4.9 |
| Isopropyl Alcohol | 2.1 |
| Diacetone Alcohol | 1.9 |
| Ethyl Alcohol | 0.9 |
| Glycol Ether DPM | 2.3 |
| PM Acetate | 3.7 |
| Isopropyl Alcohol | 2.9 |
| Ethyl Acetate | 0.8 |
| Normal Propyl Acetate | 5.6 |
| Isopropyl Acetate | 0 |
| Normal Propyl Alcohol | 13.4 |
| PU Resin Morchem TP-633 | 3.0 |
| PU Resin Variplus 1201 TF | 1.2 |
| Styrene Maleic Anhydride | 0.9 |
| Titanate | 0.2 |
| Wax | 3.7 |
| Plasticizer | 0.8 |
| Silicone | 0.3 |
| Total | 100.0 |

Ink Examples 1-6 were printed onto polyethylene (PE) and PET films using an anilox handproofer. The inks were dried using a standard heat gun (in this case a hair dryer) until the ink films were dry.

For a comparative example, a commercially available carbon black/nitrocellulose ink used for the same types of substrates was printed in the manner described above. The commercial ink is PT-285 (Sun Chemical).

The printed films were then placed in a microwave oven with a power output of 1250 watts for various time intervals. Results are reported in Tables 3 and 4 below.

TABLE 3

Results on PE film

Degree of charring, arcing, ignition, distortion or burning

| Time | Inv. Ex. 1 | Inv. Ex. 2 | Inv. Ex. 3 | Inv. Ex. 4 | Inv. Ex. 5 | Inv. Ex. 6 | Comparative Example |
|---|---|---|---|---|---|---|---|
| 5 sec. | Pass[1] | Pass | Pass | Pass | Pass | Pass | Fail[2] |
| 30 sec. | Pass | Pass | Pass | Pass | Pass | Pass | Discontinued[3] |
| 1 min. | Pass | Pass | Pass | Pass | Pass | Pass | Discontinued |
| 2 min. | Pass | Pass | Pass | Pass | Pass | Pass | Discontinued |
| 5 min. | Pass | Pass | Pass | Pass | Pass | Pass | Discontinued |
| 15 min. | Pass | Pass | Pass | Pass | Pass | Pass | Discontinued |
| 30 min. | Pass | Pass | Pass | Pass | Pass | Pass | Discontinued |
| 60 min. | Pass | Pass | Pass | Pass | Pass | Pass | Discontinued |

[1]pass = no evidence of charring, arcing, ignition or burning of the ink film, though distortion of the non-printed substrate may occur.
[2]fail = severe charring, arcing, ignition or burning of the ink and film.
[3]Discontinued = test was discontinued after 5 sec. since the degree of charring, arcing, ignition, distortion or burning was already severe, i.e., a fail, at that time.

TABLE 4

Results on PET film

Degree of charring, arcing, ignition, distortion or burning

| Time | Inv. Ex. 1 | Inv. Ex. 2 | Inv. Ex. 3 | Inv. Ex. 4 | Inv. Ex. 5 | Inv. Ex. 6 | Comparative Example |
|---|---|---|---|---|---|---|---|
| 5 sec. | Pass[1] | Pass | Pass | Pass | Pass | Pass | Fail[2] |
| 30 sec. | Pass | Pass | Pass | Pass | Pass | Pass | Discontinued[3] |
| 1 min. | Pass | Pass | Pass | Pass | Pass | Pass | Discontinued |
| 2 min. | Pass | Pass | Pass | Pass | Pass | Pass | Discontinued |
| 5 min. | Pass | Pass | Pass | Pass | Pass | Pass | Discontinued |
| 15 min. | Pass | Pass | Pass | Pass | Pass | Pass | Discontinued |
| 30 min. | Pass | Pass | Pass | Pass | Pass | Pass | Discontinued |
| 60 min. | Pass | Pass | Pass | Pass | Pass | Pass | Discontinued |

[1]pass = no evidence of charring, arcing, ignition or burning of the ink film, though distortion of the non-printed substrate may occur.
[2]fail = severe charring, arcing, ignition or burning of the ink and film
[3]Discontinued = test was discontinued after 5 sec. since the degree of charring, arcing, ignition, distortion or burning was already severe, i.e., a fail, at that time.

The data in Tables 3 and 4 shows that the inks described herein and the substrates on which they are printed are resistant to charring, arcing, ignition, distortion or burning when compared to the comparative example. The comparative example ink and the substrates on which they are printed were severely damaged after 5 seconds, while the inventive inks and the substrates on which they are printed showed minimal or no damage after 1 hour.

Photographs of prints are shown in FIG. 1. These prints were made on polyester film that, in the case of the Example 1 ink print, was exposed to microwave energy at 1250 watts for 60 minutes, and in the case of the comparative example ink print was exposed to microwave energy for 5 seconds at 1250 watts. No ignition charring, arcing etc. is present in the Example 1 print, whereas the comparative example print failed essentially immediately, that is, before or by 5 seconds of microwave exposure.

| Inventive Example 7 | |
|---|---|
| Components | wt % |
| Normal Propyl Acetate | 13.7 |
| Normal Propyl Alcohol | 30.3 |
| Ethyl Alcohol | 10.2 |
| Isopropyl Alcohol | 8.7 |
| Ethyl Acetate | 3.1 |
| Isopropyl Acetate | 0.1 |
| Nitro Cellulose Resin | 5.6 |
| Urethane Resin | 4.5 |
| Styrene Maleic Anhydride | 1.4 |
| Titanate | 0.4 |
| Additives | 0.7 |
| Raven 1180 Carbon Black Pigment 7 | 21.3 |

| Inventive Example 8 | |
|---|---|
| Components | wt % |
| Normal Propyl Alcohol | 10.4 |
| Normal Propyl Acetate | 5.4 |
| Ethoxy Propanol | 35.1 |
| Isopropyl Acetate | 0.1 |
| Isopropyl Alcohol | 5.8 |
| Diacetone Alcohol | 2.4 |
| Ethyl Alcohol | 1.2 |
| Glycol Ether DPM | 3 |
| PM Acetate | 4.9 |
| Ethyl Acetate | 1 |
| Nitro Cellulose Resin | 4.9 |
| Urethane Resin | 5.4 |
| Styrene Maleic Anhydride | 1.2 |
| Titanate | 0.3 |
| Additives | 0.6 |
| Raven 1180 Carbon Black Pigment 7 | 18.3 |

| Inventive Example 9 | |
|---|---|
| Components | wt % |
| Normal Propyl Alcohol | 13.3 |
| Normal Propyl Acetate | 6.1 |
| Isopropyl Alcohol | 5.7 |
| Diacetone Alcohol | 2.3 |
| Ethyl Alcohol | 1.2 |
| Glycol Ether DPM | 2.9 |
| PM Acetate | 4.7 |
| Ethyl Acetate | 1 |
| Isopropyl Acetate | 0.1 |
| Propoxy Propanol | 31.5 |
| Nitro Cellulose Resin | 4.9 |
| Urethane Resin | 5.2 |
| Styrene Maleic Anhydride | 1.2 |
| Titanate | 0.3 |
| Raven 1180 Carbon Black Pigment 7 | 19.8 |

| Inventive Example 10 | |
|---|---|
| Components | wt % |
| Normal Propyl Acetate | 12.2 |
| Normal Propyl Alcohol | 30.6 |
| Nitro Cellulose Resin | 5.5 |

Inventive Example 10

| Components | wt % |
|---|---|
| Isopropyl Alcohol | 2.3 |
| Additives | 0.7 |
| Raven 1180 Carbon Black Pigment 7 | 20.8 |
| Ethyl Alcohol | 8 |
| Normal Propyl Alcohol | 0.9 |
| Urethane Resin | 3.5 |
| Isopropyl Alcohol | 5 |
| Normal Propyl Acetate | 1.1 |
| Ethyl Acetate | 2.4 |
| Isopropyl Acetate | 0 |
| Styrene Maleic Anhydride | 1.1 |
| Titanate | 0.3 |
| Wax | 4.2 |
| Plasticizer | 0.9 |
| Silicone | 0.4 |

Inventive Example 11

| Components | wt % |
|---|---|
| Additives | 0.7 |
| Raven 1180 Carbon Black Pigment 7 | 19.8 |
| Nitro Cellulose Resin | 5.3 |
| Urethane Resin | 4.7 |
| Styrene Maleic Anhydride | 1.1 |
| Titanate | 0.3 |
| Wax | 4.2 |
| Plasticizer | 0.9 |
| Silicone | 0.4 |
| Normal Propyl Alcohol | 4.6 |
| Normal Propyl Acetate | 3.6 |
| Ethyl Alcohol | 1 |
| Glycol Ether DPM | 2.6 |
| PM Acetate | 4.2 |
| Isopropyl Alcohol | 5.5 |
| Ethyl Acetate | 0.9 |
| Diacetone Alcohol | 2.1 |
| Isopropyl Acetate | 0.1 |
| Ethoxy Propanol | 38 |

Inventive Example 12

| Components | wt % |
|---|---|
| Propoxy Propanol | 31.5 |
| Raven 1180 Carbon Black Pigment 7 | 19.8 |
| Nitro Cellulose Resin | 4.9 |
| Isopropyl Alcohol | 2.1 |
| Diacetone Alcohol | 1.9 |
| Ethyl Alcohol | 0.9 |
| Glycol Ether DPM | 2.3 |
| PM Acetate | 3.7 |
| Isopropyl Alcohol | 2.9 |
| Ethyl Acetate | 0.8 |
| Normal Propyl Acetate | 5.6 |
| Isopropyl Acetate | 0 |
| Normal Propyl Alcohol | 13.4 |
| Urethane Resin | 4.2 |
| Styrene Maleic Anhydride | 0.9 |
| Titanate | 0.2 |
| Wax | 3.7 |
| Plasticizer | 0.8 |
| Silicone | 0.3 |

Ink Examples 1-6 were printed onto polyethylene (PE) and PET films using an anilox handproofer. The inks were dried using a standard heat gun (in this case a hair dryer) until the ink films were dry.

For a comparative example, a commercially available carbon black/nitrocellulose ink used for the same types of substrates was printed in the manner described above. The commercial ink is PT-285 (Sun Chemical).

The printed films were then placed in a microwave oven with a power output of 1250 watts for various time intervals. Results are reported in Tables 5 and 6 below.

TABLE 5

Results on PE film

Degree of charring, arcing, ignition, distortion or burning

| Time | Inv. Ex. 7 | Inv. Ex. 8 | Inv. Ex. 9 | Inv. Ex. 10 | Inv. Ex. 11 | Inv. Ex. 12 | Comparative Example |
|---|---|---|---|---|---|---|---|
| 5 sec. | Pass[1] | Pass | Pass | Pass | Pass | Pass | Fail[2] |
| 30 sec. | Pass | Pass | Pass | Pass | Pass | Pass | Discontinued[3] |
| 1 min. | Pass | Pass | Pass | Pass | Pass | Pass | Discontinued |
| 2 min. | Pass | Pass | Pass | Pass | Pass | Pass | Discontinued |
| 5 min. | Pass | Pass | Pass | Pass | Pass | Pass | Discontinued |
| 15 min. | Pass | Pass | Pass | Pass | Pass | Pass | Discontinued |
| 30 min. | Pass | Pass | Pass | Pass | Pass | Pass | Discontinued |
| 60 min. | Pass | Pass | Pass | Pass | Pass | Pass | discontinued |

[1] pass = no evidence of charring, arcing, ignition or burning of the ink film, though distortion of the non-printed substrate may occur.

[2] fail = severe charring, arcing, ignition or burning of the ink and film

[3] Discontinued = test was discontinued after 5 sec. since the degree of charring, arcing, ignition, distortion or burning was already severe, i.e., a fail, at that time.

TABLE 6

Results on PET film

Degree of charring, arcing, ignition, distortion or burning

| Time | Inv. Ex. 7 | Inv. Ex. 8 | Inv. Ex. 9 | Inv. Ex. 10 | Inv. Ex. 11 | Inv. Ex. 12 | Comparative Example[2] |
|---|---|---|---|---|---|---|---|
| 5 sec. | Pass[1] | Pass | Pass | Pass | Pass | Pass | Fail |
| 30 sec. | Pass | Pass | Pass | Pass | Pass | Pass | discontinued[2] |
| 1 min. | Pass | Pass | Pass | Pass | Pass | Pass | discontinued[2] |
| 2 min. | Pass | Pass | Pass | Pass | Pass | Pass | discontinued[2] |
| 5 min. | Pass | Pass | Pass | Pass | Pass | Pass | discontinued[2] |
| 15 min. | Pass | Pass | Pass | Pass | Pass | Pass | discontinued[2] |
| 30 min. | Pass | Pass | Pass | Pass | Pass | Pass | discontinued[2] |
| 60 min. | Pass | Pass | Pass | Pass | Pass | Pass | discontinued[2] |

[1] pass = no evidence of charring, arcing, ignition or burning of the ink film, though distortion of the non-printed substrate may occur.
[2] fail = severe charring, arcing, ignition or burning of the ink and film
[3] Discontinued = test was discontinued after 5 sec. since the degree of charring, arcing, ignition, distortion or burning was already severe, i.e., a fail, at that time.

The data in Tables 5 and 6 shows that the inks described herein and the substrates on which they are printed are resistant to charring, arcing, ignition, distortion or burning when compared to the comparative example. The comparative example ink and the substrates on which they are printed were severely damaged after 5 seconds, while the inventive inks and the substrates on which they are printed showed minimal or no damage after 1 hour.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. A printing ink composition suitable for microwaveable packaging comprising
    2.0 wt % to 8.0 wt %, based on the total weight of the ink composition, of nitrocellulose resin,
    50-80 wt % of solvent,
    2.0 wt % to 8.0 wt %, based on the total weight of the ink composition, of a polyurethane resin, and
    5.0 wt % to 35 wt % based, on the total weight of the ink composition, of a carbon black pigment having at least one of an imaginary permittivity of ≤3 and a surface oxygen content of 1 wt % to 3 wt %,
    wherein packaging having printed thereon the ink composition exhibits no evidence for at least one of charring, arcing, ignition and burning after exposure to 1250 watts of microwave energy for a duration of 5 seconds or longer.

2. The printing ink composition of claim 1, wherein the carbon black pigment has an imaginary permittivity of ≤2, and a surface oxygen content of 1.5 wt % to 2.5 wt %.

3. The printing ink composition of claim 1, further comprising a styrene modified maleic anhydride resin.

4. The printing ink composition of claim 3, wherein the styrene modified maleic anhydride resin is present in an amount of 0.3 wt % to 4.0 wt %, based on the total weight of the ink composition.

5. The printing ink composition of claim 3, wherein the styrene modified maleic anhydride resin comprises a partial mono ester of styrene modified maleic anhydride and a mixture of two alcohols.

6. The printing ink composition of claim 1, further comprising another resin selected from polyester, polyurethane, polyamide, polyvinyl butyral (PVB), styrene modified resins and combinations thereof.

7. The printing ink composition of claim 1, wherein the nitrocellulose resin is present in an amount of 3.0 wt % to 7.0 wt %, based on the total weight of the ink composition.

8. The printing ink composition according to claim 7, wherein the polyurethane resin is present in an amount from 4.5 wt % to 6.5 wt, and
    the carbon black pigment is present in an amount from 10.0 wt % to 25 wt %.

9. The printing ink composition of claim 1, wherein the polyurethane resin is present in an amount of 4.0 wt % to 8.0 wt %, based on the total weight of the ink composition.

10. The printing ink composition of claim 1, wherein the carbon black having at least one of an imaginary permittivity of ≤3, and a surface oxygen content of 1 wt % to 3 wt %, is present in an amount of 10 wt % to 25 wt %, based on the total weight of the ink composition.

11. The printing ink composition of claim 1, wherein the polyurethane resin is an elastomeric resin.

12. The printing ink composition of claim 1, wherein the polyurethane is non-reactive with the other formulations in the composition.

13. The printing ink composition of claim 1, wherein the polyurethane resin is semi-aliphatic.

14. The printing ink composition of claim 1, wherein the polyurethane resin is tin-free.

15. The printing ink composition of claim 1, wherein the polyurethane resin has a weight average molecular weight of 90,000 to 120,000.

16. The printing ink composition of claim 1, wherein the solvents are selected from aliphatic alcohols, ester solvents and blends thereof.

17. The printing ink composition of claim 1, further comprising additives selected from polyolefin-based waxes, plasticizers, polysiloxanes, metal chelates, and combinations thereof.

18. A printed packaging material comprising the printing ink composition of claim 1 that is printed on a substrate.

19. The printed packaging material of claim 18, wherein the substrate is a polymeric film selected from polyethylene terephthalate, polyethylene terephthalate glycol, polybutylene terephthalate, polycarbonate, polyolefin, cyclic polyolefins, alpha-polyolefins, polyethylene, polypropylene, oriented polypropylene, oriented polystyrene, polyvinyl chloride, and nylon.

20. The printed packaging material of claim 18, wherein the material exhibits no evidence for at least one of charring, arcing, ignition and burning after exposure to 1250 watts of microwave energy for a duration of 5 seconds or longer.

21. A process for providing a printed packaging film that can withstand exposure to 1250 watts without undergoing at least one of charring, arcing, ignition and burning comprising:
   printing onto a packaging film substrate a printing ink composition comprising:
   2-8 wt % of nitrocellulose resin,
   2-8 wt % of polyurethane resin,
   50-80 wt % of solvent, and
   10-25 wt % of a carbon black pigment having at least one of an imaginary
   permittivity of ≤3 and a surface oxygen content of 1 wt % to 3 wt %, and drying the ink composition,
   wherein the printed packaging film exhibits no evidence for at least one of charring, arcing, ignition and burning after exposure to 1250 watts of microwave energy for a duration of 5 seconds or longer.

22. The process according to claim 21 wherein the packaging film substrate is a polymeric film selected from polyethylene terephthalate, polyethylene terephthalate glycol, polybutylene terephthalate, polycarbonate, polyolefin, cyclic polyolefins, alpha-polyolefins, polyethylene, polypropylene, oriented polypropylene, oriented polystyrene, polyvinyl chloride, and nylon.

* * * * *